(12) United States Patent
Cheng et al.

(10) Patent No.: US 7,050,397 B2
(45) Date of Patent: May 23, 2006

(54) APPARATUS, AND ASSOCIATED METHOD, FOR FACILITATING RETRANSMISSION OF DATA PACKETS IN A PACKET RADIO COMMUNICATION SYSTEM THAT UTILIZES A FEEDBACK ACKNOWLEDGEMENT SCHEME

(75) Inventors: Mark W. Cheng, San Diego, CA (US); Liangchi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 238 days.

(21) Appl. No.: 10/612,477

(22) Filed: Jul. 2, 2003

(65) Prior Publication Data

US 2005/0002363 A1    Jan. 6, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04J 3/16* (2006.01)
*H04J 3/22* (2006.01)
*H04L 1/00* (2006.01)
*H04L 12/26* (2006.01)
*H04Q 7/00* (2006.01)

(52) U.S. Cl. ................. 370/235; 370/328; 370/465
(58) Field of Classification Search ............. 370/328, 370/464, 465, 469, 235–236; 714/1, 100
See application file for complete search history.

(56) References Cited

U.S. PATENT DOCUMENTS

| | | | | |
|---|---|---|---|---|
| 6,473,399 | B1 * | 10/2002 | Johansson et al. | 370/229 |
| 6,731,623 | B1 * | 5/2004 | Lee et al. | 370/349 |
| 2002/0152342 | A1 * | 10/2002 | Das et al. | 710/117 |
| 2002/0191544 | A1 * | 12/2002 | Cheng et al. | 370/236 |
| 2003/0214935 | A1 * | 11/2003 | Khan et al. | 370/349 |

OTHER PUBLICATIONS

Medium Access Control (MAC) Standard for cdma2000 Spread Spectrum Systems, 3rd Generation Partnership Project 2 "3GPP2", Feb. 13, 2004, pp. 2-33-2-46, Release D. v. 1.
Data Service Options for Spread Spectrum Systems Addendum 2, 3rd Generation Partnership Project 2 "3GGP2", Aug. 21, 2000, Version 2.0, pp. 3-6-3-20.

* cited by examiner

*Primary Examiner*—Seema S. Rao
*Assistant Examiner*—Kevin C. Harper
(74) *Attorney, Agent, or Firm*—Banner & Witcoff, Ltd.

(57) ABSTRACT

Apparatus, and an associated method, for a frame-formatted radio communication system. Coordination is provided between MAC and RLP layers of a sending station through use of apparatus embodied at the MAC layer of the sending station. Also, apparatus is provided at a receiving station to reduce the generation of RLP layer NAK during segmented RLP frame retransmissions.

17 Claims, 5 Drawing Sheets

APPARATUS, AND ASSOCIATED METHOD, FOR FACILITATING RETRANSMISSION OF DATA PACKETS IN A PACKET RADIO COMMUNICATION SYSTEM THAT UTILIZES A FEEDBACK ACKNOWLEDGEMENT SCHEME

The present invention relates generally to a radio communication system, such as an IS-2000-compliant cellular communication system, that communicates frame-formatted, or other packet-formatted, data pursuant to a hybrid ARQ (HRAQ), or other, acknowledgment feedback and retransmission scheme. More particularly, the present invention relates to apparatus, and an associated method, by which to coordinate packet retransmissions when the acknowledgment feedback and packet formatting schemes are carried out at multiple logical layers of the radio communication system. The present invention also more particularly relates to apparatus, and an associated method, by which better to control generation of negative acknowledgment requests when data frames are retransmitted at data rates lower than at initial data transmission rates.

Coordination between the logical layers is provided to permit earlier retransmission, when necessary, of a data frame. When an indication of failure of delivery of a data frame is detected at a lower-logical layer, an indication of the failed delivery is provided to a high-logical level and the data retransmission commences. Multiple-layer feedback acknowledgments are obviated. And, when retransmission of the data frame occurs at a reduced data rate, a failed delivery indication is less likely to be generated merely due to the reduced rate of retransmission of the data frame. When implemented in a CDMA-2000 cellular communication system that provides for reverse-link 1xEV-DV communication services, improved communications are provided. Better control of communication when segmented frames are retransmitted is provided, and improved coordination between RLP and H-ARQ retransmissions is provided.

BACKGROUND OF THE INVENTION

Many aspects of modern society require the communication of data pursuant to the effectuation of communication services. And, the need to communicate data shall likely continue and perhaps increase as advancements in communication technologies permit additional types of communication services to be effectuated.

Data is communicated by way of a communication system. A communication system includes, at a minimum, a set of communication stations including a first communication station and a second communication station. The communication stations are interconnected by way of a communication channel. Data is originated at a first of the communication stations, referred to as a sending station. The data is sent by the sending station upon the communication channel to be delivered to at least a second of the communication stations, referred to as a receiving station. The receiving station detects the data communicated thereto and operates to recover the informational content thereof.

A radio communication system is a communication system that utilizes radio channels upon which to communicate data between the communication stations. The radio channels are formed upon radio links defined upon a radio air interface. Wire line communication systems, in contrast, require a fixed, i.e., a wire line, connection between the communication stations upon which to form communication channels that are permitting of the communication of data therebetween.

Radio communication systems provide various advantages that sometimes favor their use over corresponding wire line communication systems. The physical infrastructure of a radio communication system, for instance, is generally relatively less costly to install than that of a corresponding wire line communication system. Initial deployment costs of a radio communication system, therefore, are generally less than those of corresponding wireline communication systems. Additionally, and significantly, a radio communication system can be implemented as a mobile communication system. In a mobile communication system, communication mobility is provided. That is, one or more of the communication stations of a mobile communication system is mobile and not limited to operation at a fixed position.

A cellular communication system is a type of mobile radio communication system that has achieved significant levels of usage. The networks of various cellular communication systems have been deployed to encompass many populated portions of the world. Telephonic communications are provided by way of the networks of cellular communication systems through the use of mobile stations. That is, radio communications are effectuated during operation of the cellular communication system between a network part of the communication system and a mobile station to effectuate a communication service.

The area encompassed by the cellular communication system is defined by the placement of fixed-site base transceiver stations. The base transceiver stations each define a coverage area, referred to as a cell, and the aggregated areas of the cells defined by the coverage areas of all of the base transceiver stations together define the area encompassed by the system. The network part of the cellular communication system also includes control entities and entities permitting connection with other communication networks, such as PSTNs (public-switched, telephonic networks) or PDNs (packet data networks), such as the Internet.

A mobile station, when used to communicate data, usually communicates with the base transceiver station positioned in closest proximity to the mobile station. Viz., the mobile station communicates with the base transceiver station that defines the cell in which the mobile station is positioned.

Successive generations of cellular communication systems have been developed and deployed. New-generation systems are being deployed and others are under development. Certain of the new-generation systems are referred to as being third-generation (3G) systems. In general, these systems are predicated at least in part upon packet-based communication schemes. In a packet communication scheme, data that is to be communicated is formatted into packets and the packet-formatted data is communicated in the form of a series of data packets to effectuate the communication of the data pursuant to a communication service. And, additional systems, sometimes referred to as successor-generation systems, are also predicated at least in part upon packet-based, e.g., frame-formatted, communication schemes.

The operating parameters are of an exemplary third generation communication system is set forth in an operating specification referred to as the CDMA 2000 operating specification. The operating parameters set forth in the CDMA 2000 operating specification provides for packet based data communication services. Further operating parameters related to high speed data communication services have also been promulgated to provide for the effectuation of high speed data communication services in the CDMA 2000 system. A 1xEV-DV data communication scheme, for example, provides the operating parameters pursuant to which high speed data communication services can be effectuated in conjunction with a CDMA 2000 communication system. High speed data communication services are effectuated in either direction, i.e., by the network part to a mobile station as well as, also, by a mobile station to the network part.

Existing versions of the operating specification define the communication system in terms of logical layers, including an RLP (Radio Link Protocol) logical layer and an MAC (Medium Access Control) layer or sub-layer. RLP-formatted data packets, or frames, are formed at the RLP layer, and MAC layer formatting is performed at the MAC layer. Both layers utilize a feedback acknowledgment scheme used to determine whether to retransmit a data frame. The RLP layer utilizes a NAK-based retransmission scheme and the MAC layer utilizes and H-ARQ scheme.

Additionally, the operating specification defines a reverse Packet Data channel (R-PDCH). Two different types of transmissions are permitted on this channel. First, autonomous transmission is defined. In autonomous transmission, an "always on" data connection, minimally controlled, is provided. When the mobile station operates pursuant to autonomous transmission, the mobile station is permitted to communicate data at a data rate up to a predetermined data rate. Scheduled transmission is also defined. In scheduled transmission, the network part, e.g., the base station, determines when the mobile station is permitted to transmit at next higher rates from the autonomous transmission, up to the peak data rate. In addition to the communication of relatively short frame lengths, e.g., five or ten milliseconds, to improve the delay performance of communications, hybrid ARQ (H-ARQ) feedback is also utilized for the reverse link to reduce the frame error rate due to power control inaccuracies.

For instance, any time in which the mobile station is to communicate data, the mobile station is autonomously permitted to transmit at data rates up to a data rate, e.g., 9.6 kbps, specified during the call set-up procedures. For scheduled transmission, the mobile station requests permission to transmit, and the network part responds with a grant, including a rate assignment. The mobile station is then permitted to transmit the data during a permitted duration and at a permitted data rate.

Both autonomous and scheduled transmission uses the same type of H-ARQ feedback acknowledgment mechanism. The H-ARQ scheme exhibits the attributes of multiple ARQ "channels" and synchronous acknowledgment. Retransmissions of an encoder packet is performed up to a selected number of retransmissions. With the use of reverse link H-ARQ procedures, a symmetric H-ARQ mechanism is provided at the MAC sub-layer between the mobile station and the base transceiver station of the communication system.

One problem with the existing communication scheme set forth in the existing version of the operating specification pertains to feedback acknowledgments during retransmission of data packets or frames. An RLP-formatted frame might first be communicated in non-segmented form at a high data rate and then retransmitted in segmented form at a lower data rate. When retransmitted at the lower data rate, a base transceiver station forming a receiving station might indicate a failure of delivery of the data due to timeout caused by its retransmission at a low data rate even through the retransmission of the data frame is ongoing.

Additionally, due to the multiple layers of feedback acknowledgments, excessive air resources are used to communicate the feedback acknowledgments at the multiple layers. The multiple-layer feedback is duplicative and wasteful of radio resources.

If a manner could be provided by which better to provide control over the retransmission of data pursuant to an acknowledgment feedback scheme would therefore be advantageous.

It is in light of this background information related to retransmission of data in a packet communication system that the significant improvements of the present invention have evolved.

SUMMARY OF THE INVENTION

The present invention, accordingly, advantageously provides apparatus, and an associated method, for facilitating communication of packet data in a radio communication system, such as an IS-2000-compliant, cellular communication system. Frame-formatted, or other packet-formatted data is communicated pursuant to an H-ARQ, or other, acknowledgment and retransmission scheme.

Through operation of an embodiment of the present invention, a manner is provided by which to coordinate frame retransmissions when the acknowledgment feedback and packet formatting schemes are carried out at multiple logical layers of the radio communication system.

Also through operation of an embodiment of the present invention, a manner is provided by which better to control generation of negative acknowledgment requests when data frames are retransmitted at data rates are lower than at initial data transmission rates.

In one aspect of the present invention, coordination between the logical layers is provided, and earlier retransmission, when necessary, of data is permitted. When an indication of failure of delivery of a data frame is detected at a lower logical layer, a message is formed thereat, forming an indication of the failed delivery. The message is provided to a higher logical layer level, and the data retransmission commences. The need otherwise to utilize otherwise multiple layer feedback acknowledgments is obviated.

In another aspect of the present invention, failed delivery indications are less likely to be generated when the retransmission of data is performed in segmented parts. That is to say, when non-segmented data is first transmitted and then retransmitted in segmented form at a reduced data rate, a failed delivery indication is less likely to be returned merely due to the lowered rate at which the data is retransmitted. False indications of failure of delivery of data is less likely to occur, resulting in improved communication performance as well as better utilization of radio resources in the communication system.

In an exemplary implementation, improved communications in a CDMA-2000, cellular communication system that provides for 1xEV-DV communication services are provided. Better control of communication is provided when segmented frames are retransmitted. And, improved coordination between RLP and H-ARQ transmissions is provided.

Data formatting is performed at a higher logical layer, such as an RLP (Radio Link Protocol) layer and then provided to a lower logical layer, such as an MAC (Medium Access Control) sub-layer. MAC, or other, lower level formatting is performed, and a resultant frame is communicated by a sending station to a receiving station. The communications at the MAC, or other, lower level logical layer are performed pursuant to a feedback acknowledgment scheme, in particular, an H-ARQ feedback scheme.

H-ARQ indications of either successful transmission or failed transmission are returned to the lower logical level of the sending station to be detected thereat. Responsive to detection of the indications by a detector embodied at the lower logical layer of the sending station, a status response generator generates a status response message. The status response message is provided to the RLP, or other, upper logical level layer to indicate quickly the receive indications. When failed delivery of the data is indicated, the RLP, or other upper, logical layer commences retransmission procedures. The data is provided again to the lower logical layer, and the data is retransmitted to the receiving station.

The receiving station utilizes a retransmission timer for timing time periods associated with the delivery of data thereto. The data communicated by a sending station to the receiving station is communicated in autonomous or scheduled transmission modes. The retransmission of the data might occur at a lower data rate than the initial transmission of the data. When a determination is made at the receiving station that data is received in segmented form, indicative of retransmission at a lowered data rate, the segmented portions are buffered at a resequencing buffer and a resequencing buffer timer is used to determine when to request subsequent retransmission of the data. If a segmented portion of the data is not detected in the time period within which the resequencing buffer timer times-out, an NAK indication is returned to the sending station to indicate the failed delivery of the segmented portion of the data. Accommodation is thereby made for the retransmission of the data at a lowered data rate. Unnecessary NAK indications indicating failed delivery of the data, assuming retransmission of the data at the lower transmission rate.

Thereby, improved communications and improved usage of radio resources is provided. Multi-level transmission of feedback acknowledgments at multiple levels is obviated. And, erroneous indications of failed delivery of retransmitted data is less likely to occur.

In these and other aspects, therefore, apparatus, and an associated method, is provided for a radio communication system. The radio communication system has a sending station that sends data to a receiving station. The data is formatted at an upper-level logical layer and into an upper-level data frame. The upper-level data frame is provided to a lower-level logical sub-layer. The upper-level data frame is further formatted thereat into at least one lower level frame. The lower level logical layer is operable pursuant to an H-ARQ feedback scheme. Retransmission by the sending station of the upper level data frame is facilitated if the receiving station fails adequately to receive the at least one lower level frame. An H-ARQ detector is embodied at the lower level logical sub-layer. The H-ARQ detector detects H-ARQ indications, i.e. acknowledgement, returned by the receiving station to the sending station. An H-ARQ status response generator is embodied at the lower-level logical sub-layer. The response generator is adapted to receive indications of detections made by the H-ARQ detector. The H-ARQ status response generator generates an H-ARQ status response message for delivery to the upper-level logical layer. The message notifies the upper-level logical layer when the H-ARQ detector detects an H-ARQ indication indicating that the receiving station fails adequately to receive the at least one lower-level frame. The upper-level logical layer is selectably operable responsive to receipt of the H-ARQ status response message to provide again the upper level data frame to the lower level logical sub-layer.

Also in these, and other, aspects, further apparatus, and an associated method, is provided for the radio communication system. The receiving station comprises a retransmission timer. The retransmission timer times a first time period commencing with at least anticipated reception at the receiving station of the at least one lower-level frame. The sending station selectably initially sends the at least one lower-level frame in segmented portions at a second, reduced data rate. Reception of the at least one lower level frame in the segmented portions is facilitated. A retransmission timer resetter is adapted to receive indications of detection of reception of the segmented portions of retransmission of the lower-level frame at the second, reduced data rate. The retransmission timer resetter causes resetting of the retransmission timer when the lower level frame is retransmitted in the segmented portions.

A more complete appreciation of the present invention and the scope thereof can be obtained from the accompanying drawings that are briefly summarized below, the detailed description of the presently preferred embodiments of the invention, and the appended claims.

DETAILED DESCRIPTION

Figure 1:
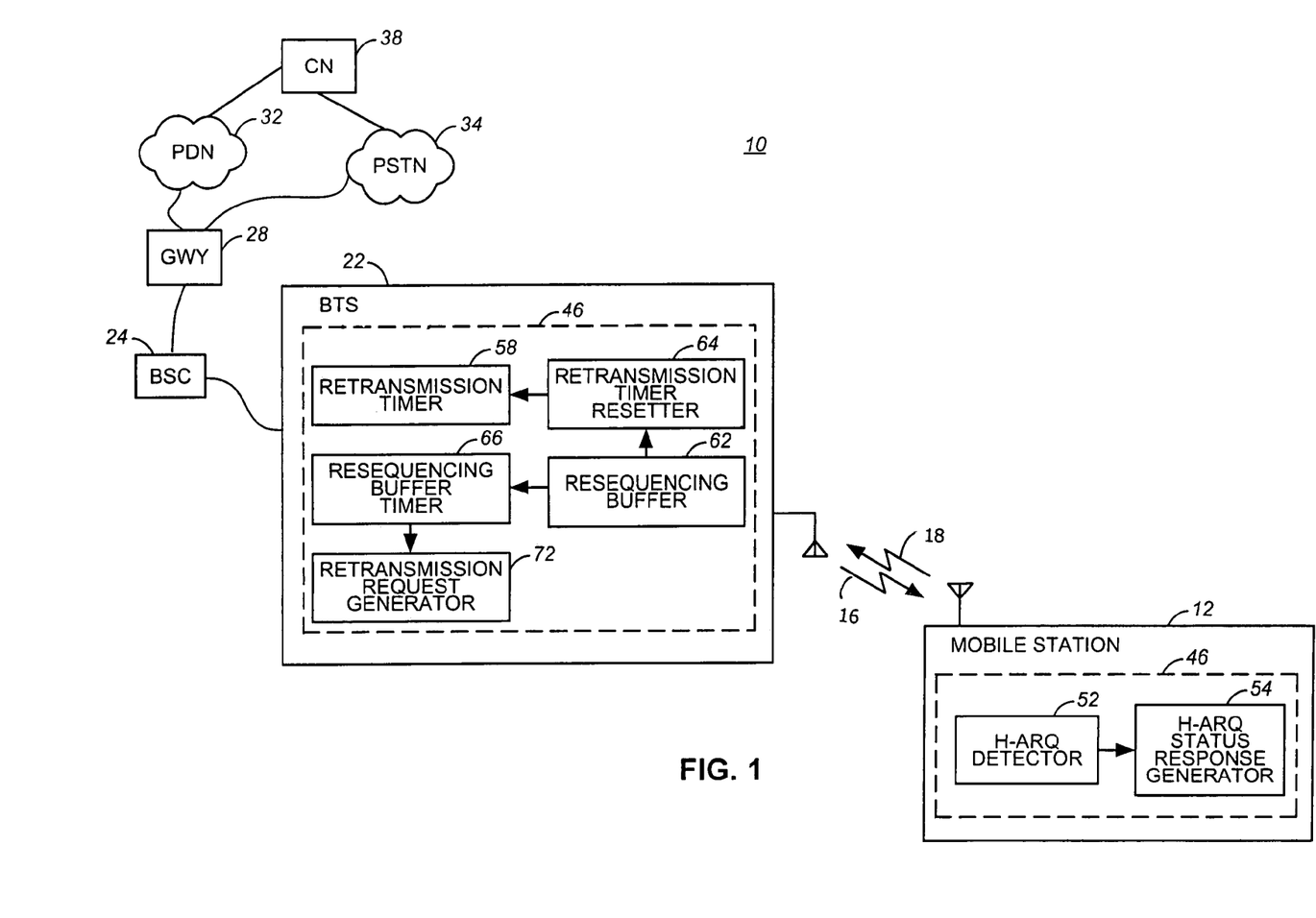
FIG. 1 illustrates a functional block diagram of a radio communication system in which an embodiment of the present invention is operable.

Referring first to FIG. 1, a radio communication system, shown generally at 10, provides for the communication of frame-formatted, or other packet-formatted, data. The communication system forms a multi-user communication system having a plurality of mobile stations, of which the mobile station is representative. Data is communicated pursuant to effectuation of communication services, including, for instance, real time VoIP (Voice over Internet Protocol) communication services.

In the exemplary implementation, the radio communication system forms a cellular communication system that operates generally pursuant to the operating protocol set forth in the CDMA 2000 operating specification. The communication system is also representative, however, of other types of communication systems. While the following description shall describe exemplary operation of an embodiment of the present invention with respect to its implementation in a CDMA 2000-compliant communication system, in other implementations, embodiments of the present invention are analogously implemented in other types of communication systems.

Data is communicated to effectuate communication services between a network part of the communication system and mobile stations operable in the communication system. When data is communicated by the network part to a mobile station, the data is communicated upon forward link channels defined upon a forward link 16. And, when data is to be communicated by a mobile station to the network part, the data is communicated upon reverse link channels defined upon a reverse link 18.

The network part includes a radio access network, here shown to include base transceiver stations, of which the base transceiver station (BTS) 22 is representative. the base transceiver stations are positioned at selected locations throughout an area, encompassed by the communication system, and within which communications by, and to, a mobile station are permitted. Each base transceiver station of the communication system defines a cell. And, a mobile station generally communicates with the base transceiver station that defines the cell in which the mobile station is positioned. The mobile station 12 and base transceiver station 22 are, in general, representative of any set of communication stations between which frame-formatted data is communicated during a communication session to effectuate a communication service.

The CDMA 2000-compliant communication system forming the communication system 10 here further provides for 1xEV-DV, high data rate communication services, both on the forward link as well as also on the reverse link. Exemplary operation of the communication system in which data, originated at the mobile station, is communicated to the base transceiver station shall be described. In some aspects, analogous operation for forward link communication are similarly implemented.

The radio access network of the network part of the communication system also includes a base station controller 24, or other control entity. The base station controller controls various aspects of the radio access network, including operation of the base transceiver station 22 to which the controller is coupled.

The base station controller 24, in turn, is coupled to a gateway (GWY) 28 that forms a gateway between the radio access network of the network part of the communication system and other portions of the network part. Here, the gateway 28 connects the radio access network to a packet data network (PDN) 32 and public switched telephonic network (PSTN) 34. A correspondent node (CN) 38 is coupled to the packet data network and public switched telephonic network. The correspondent node is representative of any data source or target that forms the ultimate source or destination of data communicated during a communication session to effectuate a communication service with, or by, a mobile station, such as the mobile station 12.

Data originated, for instance, at the correspondent node for communication to the mobile station is routed through the network part of the communication system to the base transceiver station, and base transceiver station transmits the data to the mobile station. And, for instance, data originated at the mobile station for communication to the correspondent node, is sent upon reverse link channels to be detected by the base transceiver station and, thereafter, to be routed through the network part of the communication system to the correspondent node.

As mentioned previously, communication of data, such as pursuant to a 1xEV-DV communication service, is frame-formatted, or otherwise packet-formatted. That is to say, the communication service is effectuated through the communication of successive frames of data. And, a feedback acknowledgment scheme is utilized by which feed back is provided to indicate at least when frames of data are not successfully delivered so that the data frame can be retransmitted.

During reverse link communications, data is communicated by the mobile station upon reverse link channels to a base transceiver station. Frames of data are sent upon the reverse link channels to the base transceiver station to be detected thereat. In the event that the data frame is not successfully delivered to the base transceiver station, an indication of the failure of the delivery of the data frame is returned to the mobile station pursuant to an H-ARQ feedback scheme. Because formatting and feedback conventionally is performed at an RLP (Radio Link Protocol) layer and at a MAC (Medium Access Control) layer, multiple feedbacks, for each of the layers are returned to the mobile station.

The mobile station includes apparatus, shown generally at 46, that facilitates quick retransmission of data in the event of failed delivery of a data frame to the base transceiver station. The apparatus 46 is here shown to be formed of functional entities that are implemented in any desired manner, including, for instance, algorithms executable by processing circuitry. In the exemplary implementation, the apparatus is implemented at a MAC (Medium Access Control) layer positioned beneath an RLP (Radio Link Protocol) logical layer.

Here, the apparatus 46 includes an H-ARQ detector 52 that operates to detect H-ARQ indications, indicating failed delivery of a previously-sent data frame. Indications of the detection made by the detector 52 are provided to an H-ARQ status response generator 54. The status response generator, also embodied at the MAC layer together with the H-ARQ detector, operates, in turn, to generate a message, here indicated on the line 56, that is provided to the RLP layer to indicate the failed delivery of the previously sent frame. When delivered to the RLP layer, the RLP-formatted frame is again provided to the MAC layer to be formatted thereat and thereafter retransmitted to the base transceiver station. Because the RLP layer is notified immediately of the detection at the MAC layer of the H-ARQ indication of failed delivery, the RLP layer more quickly initiates retransmission of an RLP-formatted frame. The need otherwise to await delivery of an RLP layer, NAK (negative acknowledgment) or other indication indicative of failed delivery of the frame is obviated. Improved communications are possible as well as more efficient utilization of radio resources allocated to the radio communication system.

The base transceiver station also includes apparatus 46 of an embodiment of the present invention. The apparatus 46 embodied at the base transceiver station also is formed of functional entities that are implemented in any desired manner, also, for instance, by algorithms executable by processing circuitry. The apparatus 46 operates during reverse-link communications to control when feedback indications are returned to the mobile station to indicate failed delivery of a data frame. The apparatus detects when a retransmitted data frame is transmitted in segmented portions at reduced data rates, reduced relative to a data rate at which the data is first transmitted.

A retransmission timer 58 embodied at the base transceiver station has associated therewith a first timeout. The retransmission timer operates to initiate an NAK indication to be returned to the mobile station when a data frame is not successfully delivered within the time period indicated by the first time out period. When, as described previously, retransmission of the data effectuated in segmented portions, the retransmission is carried out, sometimes at a much-reduced data rate. The apparatus includes a resequencing buffer 62 that buffers the segmented portions of the data when the data is retransmitted during operation of the communication system. The apparatus also includes a retransmission timer resetter 64. The retransmission timer resetter is coupled to receive indications of buffering at the buffer of a segmented portion of a retransmitted data frame. And, the resetter is coupled to the retransmission timer to cause resetting of the retransmission timer when a segmented portion of the retransmitted data is delivered to the base transceiver station to be stored at the resequencing buffer. And, the apparatus also includes a resequencing buffer timer 66 that operates to time a second time period. If the resequencing buffer timer times out and a segmented portion of the retransmitted data is not successfully delivered to the base transceiver station, an indication is provided to a retransmission request generator 72 that initiates a retransmission request, indicating the segmented portion, or portions, that are to be retransmitted to indicate to the mobile station that the missing segmented portion, or portions, of the data frame must again be retransmitted to the base transceiver station. Because the retransmission timer is reset inappropriate generation of NAK indications indicating failed delivery of data, merely due to retransmission at a markedly lowered transmission rate does not occur. And, through the use of the resequencing buffer timer and retransmission request generator, retransmission of segmented portions that are successfully delivered to the base transceiver station are not resent.

Figure 2:
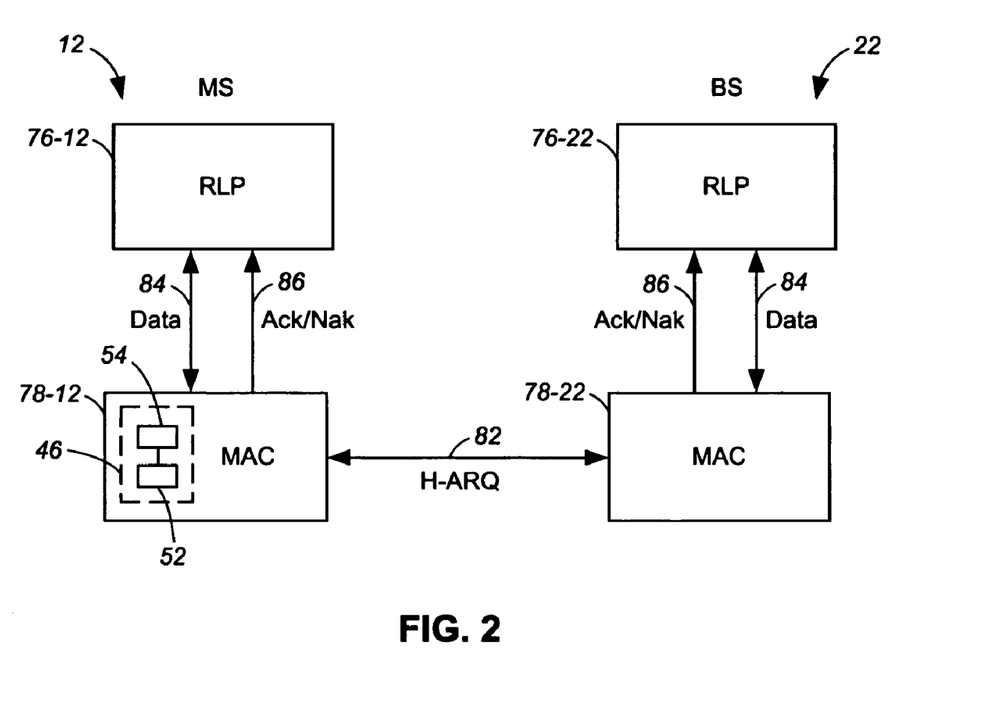
FIG. 2 illustrates a logical layer representation of portions of the radio communication system shown in FIG. 1 and of signaling generated during operation of the radio communication system pursuant to operation of an embodiment of the present invention.

FIG. 2 illustrates a representation of the mobile station 12 and base station 22 that forms portions of the radio communication system shown in FIG. 1. Two of the logical layers, the RLP and MAC layers, indicated at 76 and 78, respectively, are shown. And, the H-ARQ detector 52 and the H-ARQ status response generator 54, used pursuant to reverse-link communications, of the apparatus 46 are again shown to embodied at the MAC layer 78-12 of the mobile station.

FIG. 2 also illustrates an arrow 82 that represents the communication of H-ARQ indications, such as from the base transceiver station to the mobile station. And, communication of data between the layers of the mobile and base stations are indicated by the arrows 84, and communication of acknowledgments and negative acknowledgments between the layers is indicated by the segments 86. The message generated by the response generator 54 is indicated by the segment 86 extending between the MAC and RLP layers of the mobile station. When the message is delivered to the RLP layer, the RLP layer starts a subsequent retransmission at an earliest possible time. Through this operation, peer-to-peer RLP NAK control frames need not be communicated between the base transceiver station and the mobile station.

Instead, at the MAC layer, the status of the H-ARQ transmission is provided, and the indication, either of a successful transmission or an exhaustedly failed transmission is passed up to the RLP layer, i.e., the RLP transmitter. Once the transmitting RLP layer receives the transmission failure indication, the RLP layer starts the retransmission of the failed RLP frames immediately. In other words, the RLP retransmission is no longer triggered by a negative acknowledgment from the base transceiver station, the RLP receiver, but triggered by an NAK notification formed at the transmitting MAC layer 78-12 directly.

At the transmitting side, i.e., here, the mobile station, in order for the MAC to report the transmission status of the RLP frames, the RLP layer indicates the RLP sequence numbers for RLP frames passed down to the MAC sublayer. The MAC sublayer keeps track of the RLP sequence numbers for all of the RLP frames that are encapsulated into a physical layer SDU of each H-ARQ channel. That is to say, the MAC layer associates each RLP sequence number with H-ARQ information, such as H-ARQ channel ID, subpacket ID, etc. The MAC sublayer then indicates the transmission status of the RLP frames back to the RLP layer, after either receiving an ACK from the receiver or exhausting the allowable retransmission to complete the H-ARQ activity. With the H-ARQ transmission status indication from the MAC layer, the RLP layer 76-12 starts the retransmission for the failed frames. The RLP layer also releases the memory of the successful frames from a transmission buffer thereat. This increases not only the efficiency of the radio spectrum usage, i.e., much less or no more RLP NAK indications sent over the radio air interface, but also the throughput memory efficiency of the transmitting station.

At the receiving side, i.e., here, the base transceiver station during reverse link communications, the MAC layer and H-ARQ operations are unchanged. That is to say, normal H-ARQ ACK/NAK protocols are carried out in traditional manner. However, at the RLP receiver, i.e., the RLP layer 76-22, when an RLP frame is detected missing, RLP starts a DELAY_DETECTION_WINDOW timer or retransmission timer and waits for a subsequent round of retransmitted frame data before sending an NAK control frame back to the transmitter. Since the transmitter automatically start the retransmission of the failed frame, the retransmitted frame will arrive before the timer expires and NAK control frame is sent from the receiver, less or no more RLP NAK frames back to the transmitter over the air interface. The transmitter can be configured to stop sending the NAK control frame if the air link is good and ACK/NAK in the H-ARQ is reliable.

Figure 3:
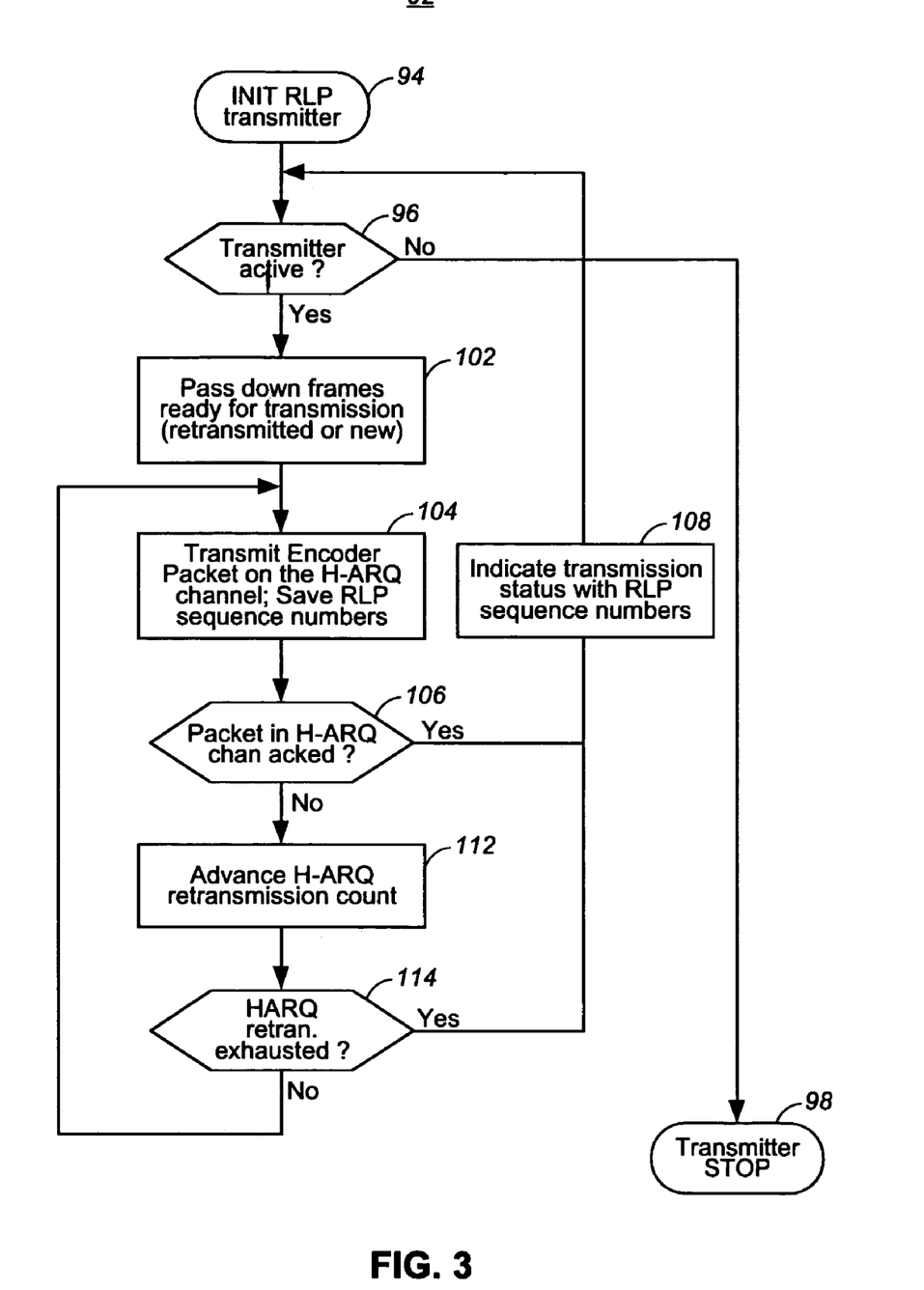
FIG. 3 illustrates a method flow diagram listing the method of operation of the method of an embodiment of the present invention.

FIG. 3 illustrates a method, shown generally at 92, representative of the transmission procedures carried out during communication of data frames to effectuate a communication service.

First, and as indicated by the block 94, all RLP variables are initialized at the transmitter, i.e., the mobile station for reverse link communications. Then, and as indicated by the decision block 96, a determination is made whether the transmitter is active. If not, the no branch is taken to the block 98 and operations stop. Otherwise, the yes branch is taken to the block 102, and the RLP layer checks for data, either new or retransmitted data, ready for transmission. Higher priority is given to retransmitted packets.

Then, and as indicated by the block 104, the RLP layer sends frames to the MAC layer with their associated RLP sequence numbers (SEQ). For a segmented frame, the RLP layer also passes down a segment sequence number (S_SEQ) associated with each segmented portion.

At the decision block 106, a determination is made as to whether a packet in the H-ARQ channel has been acknowledged (ACKED). If so, the yes branch is taken to the block 108, and the transmission status is indicated with RLP sequence numbers and loop is taken back to the decision block 96.

If, conversely, the no branch is taken from the decision block 106, the H-ARQ retransmission count is advanced, indicated by the block 112. Then, and as indicated by the decision block 114, a determination is made as to whether H-ARQ retransmission is exhausted. If so, the yes branch is taken to the block 108. If not, the no branch is taken back to the block 104. Operations continue, as appropriate.

Figure 4:
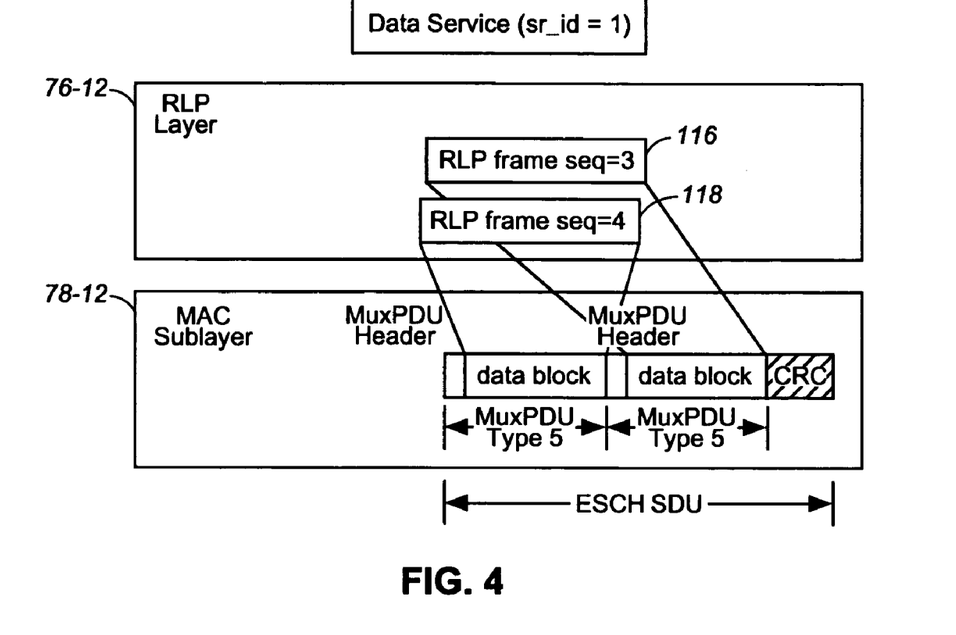
FIG. 4 illustrates a representation of an exemplary relationship between data formatted at an RLP layer and at an MAC sub-layer of a sending station operable pursuant to an embodiment of the present invention.

FIG. 4 illustrates the RLP layer 76-12 and the MAC sublayer 78-12 of the mobile station 12. Here, the procedures that are carried out by the method 92 are represented. The RLP layer passes down to the RLP frames 116 and 118 to the MAC sublayer 78-12. The associated sequence numbers are also passed down. The MAC sublayer multiplexes both the RLP frames into one physical channel SDU that later is coded for transmission. After the physical layer ARQ procedure, the MAC sublayer 78 notifies the data instance (SR_ID=1), the transmission status of RLP frames with sequence numbers 3 and 4.

Thereby, in the RLP transmitter, i.e., the RLP layer 76-12 with the feedback from the MAC sublayer, the RLP layer initiates a subsequent round of retransmission procedures without waiting for the NAK control frames from the RLP receiver (the layer 76-22, shown in FIG. 2). Also, in the MAC transmitter 78-12, the MAC layer needs to keep track of the RLP sequence numbers of all of the data blocks that are multiplexed into each physical layer SDU. At the end of the transmission, the status is passed up to the RLP layer. Primitives, i.e., requests and responses between the MAC and RLP layers are as follows:

For instance, an RLP frame is, for example, transmitted at a peak data rate (1.2 Mbps) with a 10 ms frame length, but retransmitted at an autonomous mode, e.g. 192 bits per encoder packet, sixty-four retransmissions would be required to retransmit the segmented data block. An encoder packet subsequent to encoding also includes the input bits on the forward/reverse packet data channel that consists of the information bits, the frame quality indicator bits, and tail bits. This forms a physical layer SDU. Normally, the RLP transmit timer set at a round trip time plus a factor for processing delay period. If the round trip delay is 150 ms and a factor is 100 ms, the retransmit timer is 250 ms. But, the time required to transmit the sixty-four segmented frames with a 10 ms frame length is 640 ms. This causes the RLP receiver to request a third round of RLP transmissions while the transmitter is still conducting a segmented retransmission for the second round of RLP transmission.

An effective retransmission scheme is required whenever the retransmitted frame is segmented due to an air resource limit.

Figure 6:
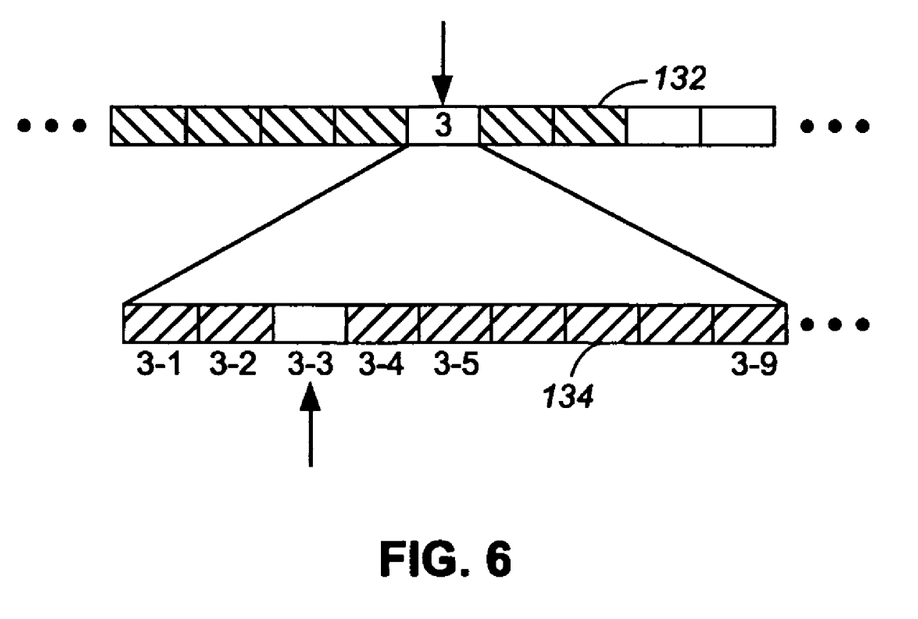
FIG. 6 illustrates a representation of exemplary communication of segmented portions of a data frame pursuant to operation of an embodiment of the present invention.

FIG. 6 illustrates a representation of retransmission of data in segmented portions and operation of the apparatus of an embodiment of the present invention by which to limit unnecessary RLP NAK during segmented RLP frame

| Primitive Type | Primitive | Parameters | Primitive Used In | Notes |
| --- | --- | --- | --- | --- |
| Request | MAC-Data | data, size, seq, s_seq | Mobile Station and Base Station | The RLP delivers an RLP to the MAC sublayer to be multiplexed into physical layer SDU; Data is an RLP frame or a segment thereof, size is the size data in bits; seq is the sequence no. of the RLP frame containing data; s_seq is the segment sequence number if the RLP frame is a segmented frame. |
| Request | MAC-Data | ack_or_nak, seq, s_seq | Mobile Station and Base Station | Indicates the transmission status of the RLP frame transmitted on F-PDCH or R-ESCH; ack_or_nak is set to NAK to indicate the failed transmission. seq is the sequence number of the RLP frame acked or naked; s_seq is the segment sequence no. if the RLP frame is a segmented frame. |

Figure 5:
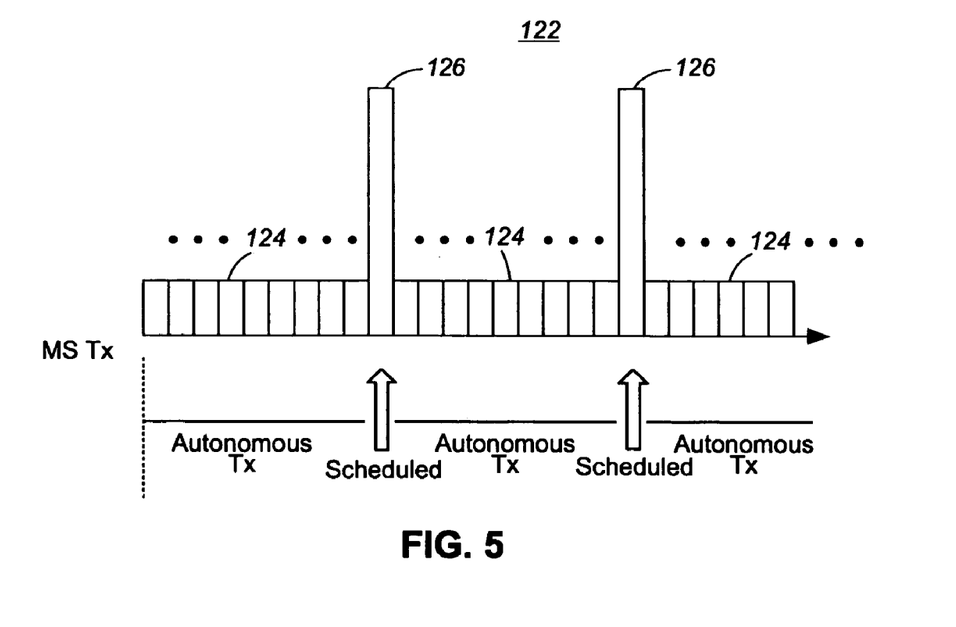
FIG. 5 illustrates a representation of an exemplary transmission pattern during exemplary operation of the communication system shown in FIG. 1.

FIG. 5 illustrates a representation, shown generally at 122, showing scheduled and autonomous transmission patterns during operation of the radio communication system shown in FIG. 1. Packet data transmission patterns in which packet data traffic is, generally, bursty, is shown. RLP frames are delivered in either segmented or non-segmented form. If a large RLP frame is transmitted at a high data rate (scheduled) non-segmented is lost and the mobile station is unable to retransmit the RLP frame at the same data rate due to the base station load or rate request delay, the retransmitted RLP frame can be transmitted in a segmented at autonomous mode. In the Figure, the blocks 124 represent autonomous transmissions at a low data rate, and the blocks 126 represent scheduled transmissions at a high data rate.

retransmissions. The top portion of the Figure illustrates frames received at a resequencing buffer and the bottom portion of the Figure illustrates frames 134 received at a sub-resequencing buffer.

When a segment of the retransmitted frame is received, an RLP receiver, the RLP layer 76-22 shown in FIG. 2, should stop the retransmission timer for the missing RLP frame and start a resequencing buffer, which is used to resequence all segmented frames for the missing frame. Note that a frame is segmented frame when a segmented data frame format is used. The NAK procedure for the subrequesencing buffer is started and is similar to that of the RLP resequencing buffer. In FIG. 6, the RLP frame number 3, so, an NAK is sent for the retransmission. Before the retransmit timer expires, segmented subpacket 3-1 arrives. The subpacket 3-1 is a segmented frame with S_SEQ field (segment sequence number) is set to zero. The receiver starts a subresequencing buffer to wait for the rest of the segments. The segments 3-2 (S_SEQ=20), 3-4 (S_SEQ=60), and 3-5 (S_SEQ=80), etc. all arrive. But, the segment 3-3 fails to arrive (S_SEQ=40) upon the expiration of the delay detection window. The RLP receiver then declares the missing segment 3-3 to be lost and an NAK control frame is sent out to request retransmission for this segment.

Thereby a manner is provided by which to reduce the generation of unnecessary RLP NAK indications.

The preferred descriptions are of the preferred examples for implementing the invention, and the scope of the invention should not necessarily be limited by this description. The scope of the present invention is defined by the following claims.

The invention claimed is:

1. Apparatus for a radio communication system having a sending station that sends data, the data formatted at an upper-level logical layer and into an upper-level data frame, and the upper-level data frame provided to a lower-level logical sublayer, the upper-level data frame further formatted thereat into at least one lower-level frame, the lower-level logical layer operable pursuant to an H-ARQ feedback scheme, said apparatus for facilitating retransmission by the sending station of the upper-level data frame if the the at least one lower-level frame fails to be adequately received, said apparatus comprising:

an H-ARQ detector embodied at the lower-level logical sublayer, said H-ARQ detector for detecting H-ARQ indications returned to the sending station; and an H-ARQ status response generator embodied at the lower-level logical sublayer of the sending station and adapted to receive indications of detections made by said H-ARQ detector, said H-ARQ status response generator for generating an H-ARQ status response message for delivery to the upper-level logical layer to notify the upper-level logical layer of the sending station when said H-ARQ detector detects an H-ARQ indication indicating that the at least one lower-level frame fails to be adequately received, the upper-level logical layer selectably operable responsive to receipt of the H-ARQ status response message to provide again the upper-level data frame to the lower-level logical sublayer.

2. The apparatus of claim 1 wherein the radio communication system further comprises a receiving station to which the sending station sends the data, said apparatus further comprising a retransmission timer embodied at the receiving station, the retransmission timer for timing a first time period commencing with detecting reception at the receiving station of the at least one lower-level frame, wherein the sending station selectably initially sends the at least one lower-level frame in segmented portions at a second, reduced data rate, and a retransmission timer resetter adapted to receive indications of detection of reception of the segmented portions of retransmission of the lower-level frame at the second, reduced data rate, said retransmission timer resetter for causing resetting of the retransmission timer when the lower-level frame is retransmitted in the segmented portions.

3. The apparatus of claim 2 wherein said receiving station further comprises a resequencing buffer, said resequencing buffer for buffering the segmented portions of the lower-level frame when delivered to the receiving station.

4. The apparatus of claim 3 wherein the receiving station further comprises a resequencing buffer timer, said resequencing buffer timer for timing a second time period commencing with detection of reception of a segmented portion of the lower-level frame when retransmitted.

5. The apparatus of claim 4 wherein the second time period timed by said resequencing buffer timer is of a time substantially corresponding to the first time period timed by the retransmission timer.

6. The apparatus of claim 4 wherein each segment of the segmented portions has associated therewith a segment identifier and wherein the receiving station further comprises a missing-segment detector for identifying which, if any, segmented portions failed to have been delivered and buffered at the resequencing buffer when the resequencing buffer times out.

7. The apparatus of claim 6 wherein the receiving station further comprises a retransmission request generator adapted to receive indications of timing out of the resequencing buffer, said retransmission request generator for generating an NAK retransmission request responsive to timing out of the resequencing buffer and detection of at least one missing segment by said missing segment detector.

8. The apparatus of claim 7 wherein the NAK retransmission request comprises missing frame indications detectable by said retransmission timer.

9. The apparatus of claim 1 wherein the lower-level logical sublayer comprises a MAC (Medium Access Control) layer and wherein said H-ARQ detector and said H-ARQ status response layer are embodied at the MAC layer.

10. The apparatus of claim 1 wherein the upper-level logical layer comprises an RLP (Radio Link Protocol) layer and wherein the H-ARQ status response message is delivered by said H-ARQ status response generator to the RLP layer.

11. The apparatus of claim 1 wherein the H-ARQ status response message is further generated to indicate successful reception of the at least one lower-level frame.

12. The apparatus of claim 1 wherein the H-ARQ status response message further identifies with which upper-level data frame that the H-ARQ indications received by said H-ARQ detector are associated.

13. The apparatus of claim 12 wherein the upper-level data frame formed by the upper-level logical layer comprises a frame sequence number and wherein the H-ARQ status response message includes an indication of the frame sequence number.

14. The apparatus of claim 13 wherein the upper level data frame comprises an RLP (Radio Link Protocol) frame and wherein the frame sequence number comprises an RLP sequence number.

15. A method of communicating in a radio communication system having a sending station that sends data to a receiving station, the data formatted at an upper-level logical layer and into an upper-level data frame, and the upper-level data frame provided to a lower-level logical sublayer, the upper-level data frame further formatted thereat into at least one lower-level frame, the lower-level logical layer operable pursuant to an H-ARQ feedback scheme, said method for facilitating retransmission by the sending station of the upper-level data frame if the receiving station fails adequately to receive the at least one lower-level frame, said method comprising:

detecting, at the lower-level logical sublayer, H-ARQ indications returned by the receiving station to the sending station;

generating an H-ARQ status response message for delivery to the upper-level logical layer to notify the upper-level logical layer of detection during said operation of detecting an H-ARQ indication indicating that the receiving station fails adequately to receive the at least one lower-level frame; and delivering the H-ARQ status response message to the upper-level logical layer.

16. The method of claim 15 further comprising the operation, responsive to delivery of the H-ARQ status response message during said operation of delivering, of providing again the upper-level data frame to the lower-level logical sublayer.

17. A method of communicating in a radio communication system having a sending station that sends data to a receiving station, the data formatted at an upper-level logical layer and into an upper-level data frame, and the upper-level data frame provided to a lower-level logical sublayer, the upper-level data frame further formatted thereat into one lower-level frame, the lower-level logical layer operable pursuant to an H-ARQ feedback scheme, the receiving station comprising a first retransmission timer, the first retransmission timer for timing a first time period commencing when a missing upper-level frame is detected at the receiving station, wherein the sending station selectably initially sends at least one upper-level frame at a first data rate and retransmits, if necessary, segmented portions of the at least one upper-level frame at a second, reduced data rate, said method for facilitating reception of the segmented portions of the at least one upper-level frame, said method comprising:

detecting reception at the receiving station of retransmission of the upper-level data frame at the second, reduced data rate;

resetting the first retransmission timer when the at least one upper-level frame is retransmitted in the segmented portions;

buffering the segmented portions of the at least one upper-level frame when delivered to the receiving station; and timing a separate time period commencing for each segmented portion of the at least one upper-level frame when the segmented portion is detected missing during the retransmission.

* * * * *